(12) United States Patent
Sun

(10) Patent No.: US 7,563,366 B2
(45) Date of Patent: Jul. 21, 2009

(54) SYSTEM FOR REMOVING BOD AND SUSPENDED SOLIDS THROUGH AN ACTIVATED SLUDGE PROCESS AND A BALLASTED FLOCCULATION PROCESS

(75) Inventor: Jyh-Wei Sun, Plano, TX (US)

(73) Assignee: OTU SA S.A., Saint-Maurice Cedex (FR)

( * ) Notice: Subject to any disclaimer, the term of this patent is extended or adjusted under 35 U.S.C. 154(b) by 0 days.

(21) Appl. No.: 12/146,120

(22) Filed: Jun. 25, 2008

(65) Prior Publication Data

US 2008/0257810 A1 Oct. 23, 2008

Related U.S. Application Data

(62) Division of application No. 11/331,540, filed on Jan. 13, 2006, now Pat. No. 7,407,582.

(51) Int. Cl.
*C02F 3/00* (2006.01)
*B01D 24/28* (2006.01)

(52) U.S. Cl. .................... 210/189; 210/195.3; 210/196; 210/253; 210/265

(58) Field of Classification Search ................ 210/189, 210/195.3, 196, 253, 265
See application file for complete search history.

(56) References Cited

U.S. PATENT DOCUMENTS

| 5,976,375 A | 11/1999 | Dorica et al. |
| 6,277,285 B1 | 8/2001 | Vion |
| 6,783,679 B1 | 8/2004 | Rozich |
| 7,153,431 B2 | 12/2006 | Daugherty |

FOREIGN PATENT DOCUMENTS

FR 2719235 11/1995

*Primary Examiner*—Chester T Barry
(74) *Attorney, Agent, or Firm*—Coats & Bennett, P.L.L.C.

(57) ABSTRACT

A method and system for treating water or wastewater to remove both soluble BOD and suspended solids. The method entails directing first and second water or wastewater streams to a treatment system including an activated sludge system and a ballasted flocculation system. The first water or wastewater stream is directed to the activated sludge system which includes at least one reactor and a clarifier. The second water or wastewater stream is directed to a ballasted flocculation system. Mixed liquor or activated sludge is directed from the activated sludge system to a mixing chamber that is located upstream from the ballasted flocculation system. The water or wastewater of the second stream is mixed with the mixed liquor or activated sludge in the mixing chamber. The mixed liquor from the mixing chamber is directed to and through the ballasted flocculation system. In the end, the soluble BOD in the second water or wastewater stream is reduced and suspended solids in the water or wastewater are also reduced.

18 Claims, 2 Drawing Sheets

SYSTEM FOR REMOVING BOD AND SUSPENDED SOLIDS THROUGH AN ACTIVATED SLUDGE PROCESS AND A BALLASTED FLOCCULATION PROCESS

CROSS REFERENCE TO RELATED APPLICATION

The present application is a divisional of U.S. patent application Ser. No. 11/331,540, now U.S. Pat. No. 7,407,582 filed Jan. 13, 2006.

FIELD OF THE INVENTION

The present invention relates to the treatment of water or wastewater, and more particularly to a combination activated sludge-ballasted flocculation process that is effective to remove both BOD and suspended solids.

BACKGROUND OF THE INVENTION

Water and wastewater treatment processes sometimes use ballasted flocculation to clarify water or wastewater. A ballasted flocculation process allows for faster settling of the flocculated material that is formed in the process. The faster settling of the ballasted floc allows for very high overflow rates in the clarifier or settling tank, and therefore allows the footprint of the total treatment system to be significantly smaller than conventional clarifiers. Furthermore, compared to other conventional clarification systems, start-up and optimation times for ballasted flocculation systems are generally shorter due to the decreased hydraulic retention times of the system.

Ballasted flocculation treatment systems employ a physical/chemical process and remove mostly particulate and colloidal solids present in the raw water or wastewater stream. Due to the physical/chemical nature of the solids removed, often times the process does not remove dissolved constituents. Of particular interest in treating water or wastewater is soluble BOD. Soluble BOD and particulate BOD are components of total BOD. While ballasted flocculation processes may achieve greater than 85% particulate BOD removal, these processes do not efficiently remove soluble BOD.

Therefore, there has been and continues to be a need for a ballasted flocculation system that will effectively remove soluble BOD.

BRIEF SUMMARY OF THE INVENTION

An activated sludge system and a ballasted flocculation system are utilized to remove suspended solids and soluble BOD. A first water or wastewater influent stream is directed into the activated sludge system. A second water or wastewater stream is directed into the ballasted flocculation system. However, activated sludge in the form of mixed liquor or return activated sludge is directed from the activated sludge system to a mixing chamber that receives the second water or wastewater stream. Here, the water or wastewater is mixed with the mixed liquor or return activated sludge to form mixed liquor that is directed from the mixing chamber through the ballasted flocculation system. Hence, soluble BOD in the second water or wastewater stream is removed by the activity of the activated sludge and suspended solids and other particulate contaminants are removed from the same water or wastewater stream by the ballasted flocculation process.

Other objects and advantages of the present invention will become apparent and obvious from a study of the following description and the accompanying drawings which are merely illustrative of such invention.

DESCRIPTION OF EXEMPLARY PROCESSES AND SYSTEMS

The present invention entails a water or wastewater treatment process that utilizes both an activated sludge process and a ballasted flocculation process. In one embodiment, the ballasted flocculation process and the activated sludge process are operated parallel. First and second water or wastewater streams are directed to the process. A first stream is directed to and through the activated sludge process while a second stream is directed to and through the ballasted flocculation process. However, to remove soluble BOD from the water or wastewater stream directed to the ballasted flocculation process, activated sludge or mixed liquor from the activated sludge process is directed to a mixing chamber that receives the water or wastewater of the second stream. This mixing chamber is disposed upstream of the ballasted flocculation process. In the mixing chamber, water or wastewater from the second stream is mixed with mixed liquor or activated sludge from the activated sludge process and the mixture formed in the mixing chamber is then directed through the ballasted flocculation process. Both streams of water or wastewater are treated with activated sludge and are subjected to clarification in both the activated sludge process and the ballasted flocculation process.

Figure 1:
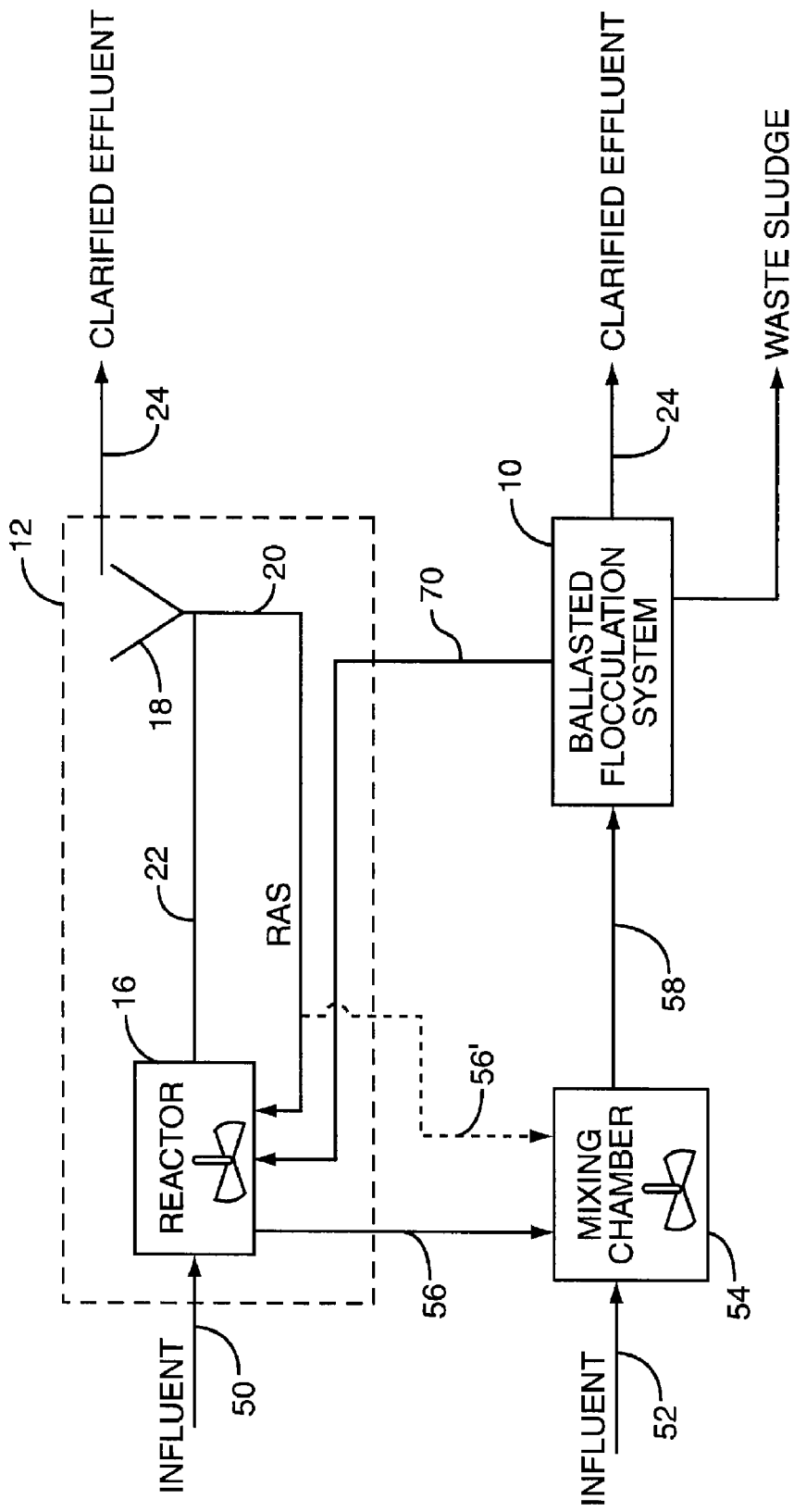
FIG. 1 is a schematic illustration of the process of the present invention.
Figure 2:
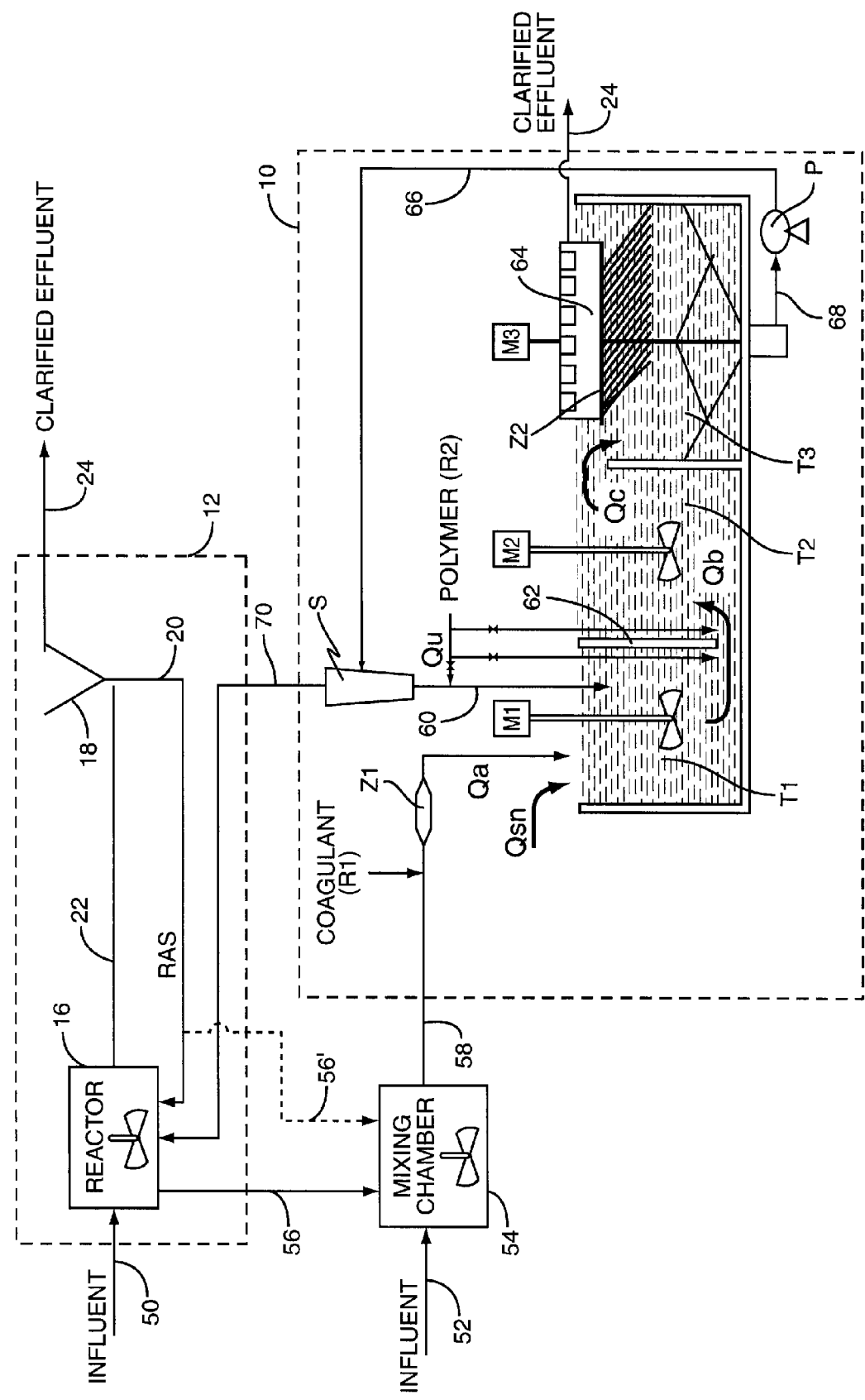
FIG. 2 is another schematic illustration of the process of the present invention showing the ballasted flocculation portion of the process in more detail.

Before reviewing the processes and systems shown in FIGS. 1-2, it may be beneficial to briefly review ballasted flocculation. A ballasted flocculation process generally entails a chemical and physical process where contaminants such as suspended solids aggregate around insoluble granular materials such as microsand to form ballasted floc particles. Through a settling process, the ballasted floc particles comprised of sand, suspended solids, and other contaminants are settled in a settling tank, producing a separated, clarified effluent. The settled sludge, including the granular material as well as solids and other contaminants, is directed to a separator which separates the granular material from the sludge. In most cases, the separated granular material is recycled back through the ballasted flocculation process. As will be appreciated from subsequent discussion, the separated sludge can be recycled to an activated sludge system or can simply be discharged and subsequently treated.

Turning to FIG. 1, there is shown therein a combined activated sludge system 12, and a ballasted flocculation system 10. As will be appreciated from subsequent portions of the disclosure, activated sludge, in the form of return activated sludge or mixed liquor, is transferred from the activated sludge system 12 to the ballasted flocculation system 10.

More particularly, and with respect to FIG. 1, the activated sludge system 12 includes an influent line 50 that is operative to direct water or wastewater to be treated into a reactor 16. Downstream from the reactor 16 is a clarifier 18. A return activated sludge (RAS) line 20 extends from the clarifier 18 back to the reactor 16. A line 22 extends from the reactor 16 to the clarifier 18. Clarifier 18 includes an outlet line 24 for directing clarified effluent from the clarifier 18.

Activated sludge system 12 can be designed to operate under aerobic, anoxic, and anaerobic conditions, or a combination of any one of these three basic activated sludge process conditions. Reactor 16 would typically include one or more mixers and could be provided with other means for aerating the contents thereof. Various types of mixers or aerators can be used to mix and/or aerate the mixed liquor in reactor 16. Typically, water or wastewater is directed into the reactor 16 and mixed with return activated sludge (RAS) that is transferred from the bottom of clarifier 18 to the reactor 16 through line 20. Together, the water or wastewater influent and return activated sludge form what is sometimes referred to as mixed liquor within reactor 16. The mixed liquor is held within the reactor 16 for a selected time period and, as noted above, can be mixed, and in the case of an aerobic process subjected to aeration. The mixed liquor in reactor 16 is directed through line 22 to the clarifier 18 where activated sludge settles to the bottom of the clarifier 18 and is eventually directed back to the reactor 16 via line 20. In conventional fashion, a portion of the return activated sludge can be wasted. Clarified effluent is directed from the clarifier via line 24.

As seen in FIG. 1, the treatment system also includes the ballasted flocculation system 10. A second influent line, line 52, directs a water or wastewater stream toward the ballasted flocculation system 10. That is, influent line 50 is directed to the activated sludge system 12, while influent line 52 is directed to a mixing chamber 54, disposed upstream from the ballasted flocculation system 10, and then from the mixing chamber 54 to the ballasted flocculation system 10. A line 56 extends from the reactor 16 of the activated sludge system 12 to the mixing chamber 54. Mixing chamber 54 is typically provided with a mixer for mixing the influent water or wastewater from influent line 52 with the mixed liquor from the reactor 16. In addition, conventional aeration means can be provided in the mixing chamber 54 to aerate the mixed liquor therein. A line 58 extends between the mixing chamber 54 and the ballasted flocculation system 10. Hence, mixed liquor contained in the mixing chamber 54 is directed to the ballasted flocculation system 10.

Alternatively, instead of mixed liquor from the reactor 16 of the activated sludge system 12 being directed to the mixing chamber 54, optionally return activated sludge (RAS) can be directed through line 56' to the mixing chamber 54. In other words, at least a portion of the return activated sludge being returned from the clarifier 18 to the reactor 16 can be directed through line 56' to the mixing chamber 54. Here, the return activated sludge is mixed with water or wastewater passing to the mixing chamber via influent line 52 to form mixed liquor in the mixing chamber 54. Thus, it is appreciated that activated sludge can be transferred to the ballasted flocculation process either by directing mixed liquor from the activated sludge system 12 to the mixing chamber 54 or directing some return activated sludge to the mixing chamber 54.

In the case of the embodiment illustrated in FIG. 1, the ballasted flocculation system 10 functions as a clarifier. That is, both the clarifier 18 forming a part of the activated sludge system 12, and the ballasted flocculation system 10 perform a clarification function. Indeed, both clarifier 18 and the ballasted flocculation system 10 function in parallel to clarify the water or wastewater that enters the activated sludge system through influent lines 50 and 52.

There are numerous applications for the general system shown in FIG. 1. In the way of an example, conventional activated sludge systems such as that shown in FIG. 1 can be expanded to have increased capacity by adding the ballasted flocculation system 10. In some activated sludge systems, clarification of the water or wastewater is the limiting process. Hence, additional clarification capacity can be added, cost effectively, to an existing activated sludge system by adding a ballasted flocculation system such as illustrated in FIG. 1.

The system disclosed herein is also effective to simultaneously treat two separate influent streams. These two influent streams may be derived by splitting or dividing a main influent stream. Water or wastewater entering influent line 50 is treated through a conventional activated sludge process and produces a clarified effluent via line 24 that leads from the clarifier 18. Water or wastewater entering influent line 52 is treated in the mixing chamber 54 as well as by the ballasted flocculation system 10. Activated sludge in the form of return activated sludge (RAS) or mixed liquor is utilized and mixed with the influent in the mixing chamber 54. Herein, the term activated sludge is meant to encompass return activated sludge (RAS) or concentrated activated sludge such as the type that is typically returned from the clarifier 18 to the reactor 16 in an activated sludge process. The term "mixed liquor" refers to a mixture that results from mixing return activated sludge or activated sludge with influent water or wastewater. Also, a mixture comprised of mixed liquor and water or wastewater influent is also referred to as mixed liquor. In any event, activated sludge, whether concentrated or diluted, is being utilized in a process that directly or indirectly involves a ballasted flocculation process.

Turning to FIG. 2, there is shown a system and process that is similar to the system and process shown in FIG. 1, but wherein the ballasted flocculation system 10 is shown in more detail. Here either mixed liquor from the reactor 16 is directed via line 56 to the mixing chamber 54 or, in the alternative, return activated sludge passing in line 20 is directed through line 56' to the mixing chamber 54 where the activated sludge is mixed with the water or wastewater influent entering through line 52. In any event, whether mixed liquor or return activated sludge is directed to the mixing chamber 54, the mixing chamber is provided with a mixer or some other form of mixing for mixing the mixed liquor or activated sludge with water or wastewater influent. Whether mixed liquor or activated sludge is mixed in the mixing chamber 54, the result is that the formed mixture will be referred to as mixed liquor. The mixed liquor in the mixing chamber 54 is directed through the ballasted flocculation system 10.

With particular reference to FIG. 2 and the ballasted flocculation system 10 shown therein, a coagulate R1 is added in line 58. An in-line mixer Z1 (which is optional) is operative to mix the coagulant R1 with the mixed liquor. In some cases, the ballasted flocculation system 10 may include a separate coagulation tank with a mixer for mixing the coagulant with the water, wastewater, or mixed liquor. Coagulant R1 may comprise various compositions such as aluminum sulfate and ferric chloride. Dosages of coagulant R1 can vary greatly based on the conditions of the mixed liquor.

For purposes of reference, the mixed liquor passing in line 58 to the ballasted flocculation system 10 is referred to as Qa. Flow Qa is directed into the ballasted flocculation system 10 and in particular to injection tank T1. Injection tank T1 includes a mixer M1. Disposed adjacent or over injection tank T1 is a hydrocyclone S. Hydrocyclone S is a conventional apparatus that is used in water and wastewater treatment to separate insoluble granular material (microsand) from sludge or floc surrounding the granular material.

As illustrated in FIG. 2, a feed line 60 extends down from the hydrocyclone S. Insoluble granular material is directed down the feed line 60 into the injection tank T1. Also communicably connected to the feed line 60 is a flocculant line for injecting a reactant such as a polymer into either the injection tank T1 or an adjacent disposed maturation tank T2. Polymer R2 can comprise various compositions. An example of an appropriate polymer is polyacrylamide polymer. Dosages of this polymer are generally less than 2.0 mg/l for wastewater treatment. However, these dosages can also vary based on the conditions of the mixed liquor and local regulations. Maturation tank T2 is separated from injection tank T1 by a partial partition or wall 62. Note that wall 62 includes a lower opening that permits flow from injection tank T1 to maturation tank T2. Flow passing under the partition wall 18 is referred to as flow Qb.

Disposed in maturation tank T2 is a mixer M2. As illustrated in FIG. 2, polymer R2, which is a flocculant, can be injected into the injection tank T1 or the maturation tank T2. Note that the flocculant injection lines extend down each side of the partition wall 18 enabling the flocculant to be injected on either side thereof. Further, as noted above, the flocculant in the form of polymer R2 can be combined with the insoluble granular material, such as microsand, and fed into the injection tank T1 via the feed line 60.

Disposed adjacent maturation tank T2 is a settling tank T3. Settling tank T3 includes a surrounding wall structure. Lamella Z2 in the form of plates or tubes is optional. Disposed above the lamella Z2 is a collection trough 64 which can be optional. Settling tank T3 includes a settling tank scraper M3. As illustrated in FIG. 2, the flow passing from the maturation tank T2 to the settling tank T3 is referred to as flow Qc.

Settling tank T3 is designed or adapted to collect or receive settled sludge about the bottom thereof. Settled sludge about a central portion of the settling tank T3 is directed through line 68 to a pump P. As will be appreciated from subsequent portions of the disclosure, the settled sludge collected in settling tank T3 and conveyed by pump P includes the insoluble granular material with floc aggregated around the granular material. This settled sludge is pumped from pump P through lines 66 to the hydrocyclone S. There, the insoluble granular material, which is typically microsand, is separated from the sludge and recycled through the process via feed line 60. Hydrocyclone S separates the sludge which includes solids and directs the separated sludge into line 70. Line 70 can extend to the activated sludge system 12 and particularly to the reactor 16. Hence the settled sludge produced by the ballasted flocculation system 10 can be recycled to the reactor 16. In some cases, the settled sludge separated by the hydrocyclone S can be directed from the wastewater treatment system for further treatment.

In a process such as illustrated herein, it is contemplated that the ballasted flocculation system 10 would be effective to remove approximately 90% to 100% of the total suspended solids (TSS) in the mixed liquor. In pilot studies conducted based on a primary influent of approximately 90-100 GPM and mixed liquor suspended solid (MLSS) of approximately 2,000-3,000 mg/L., the TSS of the effluent from the ballasted flocculation process ranged from approximately 0-4 mg/l.

It is contemplated that the soluble BOD present in the clarified effluent leaving the ballasted flocculation system 10 will be approximately 50% of the soluble BOD present in the influent entering line 52.

In tables 1, 2, 3, 4, 5, and 6, there is provided pilot test studies for a system and process similar to the FIGS. 1 and 2 that was conducted at the P Street Wastewater Treatment Facility at Fort Smith, Ark. These pilot studies indicate the removal rate for total and soluble BOD as well as soluble COD and TSS. The tables show various test results where the MLSS concentration of the mixed liquor directed into the mixing chamber 54 varied, and where the contact time in the mixing chamber 54 varied.

TABLE 1

Composite Sample Testing 800 MLSS @ 30 Min. Contact Time

| | | Total BOD (mg/l) | | | Soluble BOD (mg/l) | | | Soluble COD (mg/l) | | | TSS (mg/l) | | |
|---|---|---|---|---|---|---|---|---|---|---|---|---|---|
| Day | *Time | Primary Effluent | Ballasted Floculation Effluent | Percent Removal | Primary Effluent | Ballasted Floculation Effluent | Percent Removal | Primary Effluent | Ballasted Floculation Effluent | Percent Removal | Primary Effluent | Ballasted Floculation Effluent | Percent Removal |
| 1 | AM | 41.8 | 6.6 | 84.1 | 7.6 | 2.7 | 65.2 | 45.0 | 13.0 | 71.1 | 79.0 | 5.0 | 93.7 |
| | PM | 41.9 | 5.6 | 86.6 | 9.3 | 2.6 | 72.5 | 48.0 | 14.0 | 70.8 | 75.0 | 5.0 | 93.3 |
| 2 | AM | 67.8 | 6.4 | 90.5 | 24.8 | 3.5 | 85.7 | 68.0 | 11.0 | 83.8 | 58.0 | 6.0 | 89.7 |
| | PM | 129.6 | 35.2 | 72.9 | 69.2 | 30.3 | 56.3 | 133.0 | 50.0 | 62.4 | 74.0 | 9.0 | 87.8 |
| 3 | AM | 59.2 | 7.1 | 88.0 | 11.5 | 4.4 | 62.1 | 60.0 | 12.0 | 80.0 | 80.0 | 7.0 | 91.3 |
| | PM | 56.3 | 7.9 | 85.9 | 10.7 | 4.7 | 56.5 | 61.0 | 17.0 | 72.1 | 74.0 | 8.0 | 89.2 |
| 4 | AM | 47.7 | 6.2 | 87.1 | 8.4 | 2.9 | 65.1 | 47.0 | 10.0 | 78.7 | 76.0 | 6.0 | 92.1 |
| | PM | 41.8 | 7.0 | 83.4 | 11.9 | 4.0 | 66.5 | 55.0 | 10.0 | 81.8 | 48.0 | 6.0 | 87.5 |
| 5 | AM | 78.0 | 7.4 | 90.5 | 13.5 | 5.4 | 59.8 | 59.0 | 10.0 | 83.1 | 100.0 | 5.0 | 95.0 |
| | PM | 74.5 | 11.0 | 85.2 | 25.4 | 8.0 | 68.5 | 70.0 | 21.0 | 70.0 | 72.0 | 5.0 | 93.1 |
| 6 | AM | 30.9 | 6.7 | 78.4 | 15.5 | 4.6 | 70.4 | 60.0 | 18.0 | 70.0 | 39.0 | 5.0 | 87.2 |
| | PM | 56.5 | 12.9 | 77.2 | 33.2 | 9.5 | 71.3 | 97.0 | 25.0 | 74.2 | 52.0 | 6.0 | 88.5 |
| 7 | AM | 46.2 | 8.8 | 80.9 | 31.7 | 6.9 | 78.1 | 75.0 | 15.0 | 80.0 | 37.0 | 7.0 | 81.1 |
| | PM | 59.0 | 10.1 | 82.9 | 9.2 | 4.4 | 52.0 | 98.0 | 18.0 | 81.6 | 40.0 | 7.0 | 82.5 |
| Average | | 59.4 | 9.9 | 83.8 | 20.1 | 6.7 | 66.4 | 69.7 | 17.4 | 75.7 | 64.6 | 6.2 | 89.4 |

TABLE 2

Composite Sample Testing 800 MLSS @ 20 Min. Contact Time

| Day | *Time | Total BOD (mg/l) | | | Soluble BOD (mg/l) | | | Soluble COD (mg/l) | | | TSS (mg/l) | | |
|---|---|---|---|---|---|---|---|---|---|---|---|---|---|
| | | Primary Effluent | Ballasted Floculation Effluent | Percent Removal | Primary Effluent | Ballasted Floculation Effluent | Percent Removal | Primary Effluent | Ballasted Floculation Effluent | Percent Removal | Primary Effluent | Ballasted Floculation Effluent | Percent Removal |
| 1 | AM | 54.2 | 8.2 | 84.9 | 9.2 | 4.4 | 52.0 | 71.0 | 17.0 | 76.1 | 72.0 | 11.0 | 84.7 |
| | PM | 74.2 | 17.5 | 76.4 | 31.7 | 12.6 | 60.3 | 102.0 | 36.0 | 64.7 | 66.0 | 6.0 | 90.9 |
| 2 | AM | 33.7 | 11.4 | 66.1 | 12.2 | 6.2 | 49.6 | 41.0 | 13.0 | 68.3 | 54.0 | 6.0 | 88.9 |
| | PM | 85.1 | 12.3 | 85.5 | 34.4 | 7.2 | 79.2 | 76.0 | 23.0 | 69.7 | 127.0 | 5.0 | 96.1 |
| 3 | AM | 43.2 | 12.1 | 72.0 | 21.1 | 2.0 | 90.5 | 49.0 | 16.0 | 67.3 | 55.0 | 12.0 | 78.2 |
| | PM | 75.0 | 21.0 | 72.0 | 39.1 | 14.1 | 64.1 | 102.0 | 35.0 | 65.7 | 60.0 | 6.0 | 90.0 |
| 4 | AM | 36.0 | 8.7 | 75.8 | 17.6 | 8.2 | 53.3 | 47.0 | 17.0 | 63.8 | 43.0 | 5.0 | 88.4 |
| | PM | 59.8 | 19.9 | 66.6 | 39.4 | 16.1 | 59.3 | 91.0 | 32.0 | 64.8 | 48.0 | 8.0 | 83.3 |
| 5 | AM | 76.6 | 28.2 | 63.2 | 53.1 | 23.0 | 56.7 | 136.0 | 52.0 | 61.8 | 54.0 | 7.0 | 87.0 |
| | PM | 79.2 | 25.0 | 68.4 | 54.0 | 19.3 | 64.2 | 114.0 | 39.0 | 65.8 | 48.0 | 6.0 | 87.5 |
| | Average | 61.7 | 16.4 | 73.1 | 31.2 | 11.3 | 62.9 | 82.9 | 28.0 | 66.8 | 62.7 | 7.2 | 87.5 |

TABLE 3

Composite Sample Testing 400 MLSS @ 20 Min. Contact Time

| Day | *Time | Total BOD (mg/l) | | | Soluble BOD (mg/l) | | | Soluble COD (mg/l) | | | TSS (mg/l) | | |
|---|---|---|---|---|---|---|---|---|---|---|---|---|---|
| | | Primary Effluent | Ballasted Floculation Effluent | Percent Removal | Primary Effluent | Ballasted Floculation Effluent | Percent Removal | Primary Effluent | Ballasted Floculation Effluent | Percent Removal | Primary Effluent | Ballasted Floculation Effluent | Percent Removal |
| 1 | AM | 88.3 | 39.5 | 55.3 | 56.9 | 31.0 | 45.5 | 119.0 | 51.0 | 57.1 | 44.0 | 10.0 | 77.3 |
| | PM | 104.4 | 61.9 | 40.7 | 69.1 | 50.0 | 27.7 | 149.0 | 87.0 | 41.6 | 56.0 | 12.0 | 78.6 |
| 2 | AM | 144.5 | 86.6 | 40.1 | 108.3 | 70.2 | 35.2 | 177.0 | 119.0 | 32.8 | 57.0 | 5.0 | 91.2 |
| | PM | 114.0 | 52.7 | 53.8 | 83.0 | 41.9 | 49.6 | 167.0 | 86.0 | 48.5 | 64.0 | 7.0 | 89.1 |
| 3 | AM | 104.8 | 56.9 | 45.7 | 71.8 | 50.9 | 29.1 | 163.0 | 83.0 | 49.1 | 66.0 | 5.0 | 92.4 |
| | PM | 114.4 | 47.7 | 58.3 | 74.0 | 47.0 | 36.5 | 176.0 | 73.0 | 58.5 | 73.0 | 5.0 | 93.2 |
| 4 | AM | 116.5 | 49.6 | 57.4 | 81.3 | 41.6 | 48.8 | 161.0 | 67.0 | 58.4 | 53.0 | 7.0 | 86.8 |
| | PM | 119.7 | 55.1 | 53.9 | 82.7 | 46.3 | 44.1 | 163.0 | 82.0 | 49.7 | 74.0 | 5.0 | 93.2 |
| 5 | AM | 90.1 | 40.0 | 55.6 | 67.5 | 32.1 | 52.5 | 147.0 | 57.0 | 61.2 | 51.0 | 5.0 | 90.2 |
| | PM | 149.0 | 76.7 | 48.5 | 115.2 | 69.1 | 40.0 | 218.0 | 110.0 | 49.5 | 66.0 | 5.0 | 92.4 |
| | Average | 114.6 | 56.7 | 50.9 | 81.0 | 48.0 | 40.9 | 164.0 | 81.5 | 50.6 | 60.4 | 6.6 | 88.4 |

TABLE 4

Composite Sample Testing 200 MLSS @ 30 Min. Contact Time

| Day | *Time | Total BOD (mg/l) | | | Soluble BOD (mg/l) | | | Soluble COD (mg/l) | | | TSS (mg/l) | | |
|---|---|---|---|---|---|---|---|---|---|---|---|---|---|
| | | Primary Effluent | Ballasted Floculation Effluent | Percent Removal | Primary Effluent | Ballasted Floculation Effluent | Percent Removal | Primary Effluent | Ballasted Floculation Effluent | Percent Removal | Primary Effluent | Ballasted Floculation Effluent | Percent Removal |
| 1 | AM | 43.3 | 10.3 | 76.1 | 14.6 | 8.3 | 43.3 | 47.0 | 11.0 | 76.6 | 78.0 | 5.0 | 93.6 |
| | PM | 44.1 | 9.8 | 77.7 | 15.3 | 6.5 | 57.6 | 46.0 | 13.0 | 71.7 | 74.0 | 5.0 | 93.2 |
| 2 | AM | 21.1 | 6.2 | 70.4 | 8.1 | 3.7 | 54.1 | 45.0 | 10.0 | 77.8 | 31.0 | 5.0 | 83.9 |
| | PM | 27.8 | 9.7 | 65.3 | 13.6 | 6.7 | 51.2 | 57.0 | 13.0 | 77.2 | 43.0 | 5.0 | 88.4 |
| 3 | AM | 40.3 | 12.0 | 70.2 | 17.4 | 9.1 | 48.0 | 63.0 | 19.0 | 69.8 | 47.0 | 5.0 | 89.4 |
| | PM | 48.6 | 13.9 | 71.5 | 26.0 | 10.6 | 59.1 | 86.0 | 25.0 | 70.9 | 38.0 | 5.0 | 86.8 |
| 4 | AM | 42.6 | 9.9 | 76.7 | 31.1 | 9.4 | 69.8 | 77.0 | 23.0 | 70.1 | 34.0 | 5.0 | 85.3 |
| | PM | 92.3 | 39.6 | 72.4 | 72.4 | 36.5 | 49.7 | 143.0 | 74.0 | 48.3 | 51.0 | 5.0 | 90.2 |
| 5 | AM | 42.6 | 15.5 | 63.6 | 25.1 | 13.1 | 47.7 | 67.0 | 25.0 | 62.7 | 63.0 | 5.0 | 92.1 |
| | PM | 64.8 | 25.1 | 61.3 | 39.8 | 22.2 | 44.3 | 101.0 | 38.0 | 62.4 | 64.0 | 7.0 | 89.1 |
| | Average | 46.7 | 15.2 | 70.5 | 26.4 | 12.6 | 52.5 | 73.2 | 25.1 | 68.8 | 52.3 | 5.2 | 89.2 |

TABLE 5

Composite Sample Testing 100 MLSS @ 30 Min. Contact Time

| | | Total BOD (mg/l) | | | Soluble BOD (mg/l) | | | Soluble COD (mg/l) | | | TSS (mg/l) | | |
|---|---|---|---|---|---|---|---|---|---|---|---|---|---|
| Day | *Time | Primary Effluent | Ballasted Floculation Effluent | Percent Removal | Primary Effluent | Ballasted Floculation Effluent | Percent Removal | Primary Effluent | Ballasted Floculation Effluent | Percent Removal | Primary Effluent | Ballasted Floculation Effluent | Percent Removal |
| 1 | AM | 78.0 | 43.0 | 44.9 | 57.7 | 36.0 | 37.6 | 107.0 | 59.0 | 44.9 | 64.0 | 8.0 | 87.5 |
|   | PM | 91.5 | 44.6 | 51.3 | 60.8 | 39.2 | 35.5 | 134.0 | 73.0 | 45.5 | 82.0 | 6.0 | 92.7 |
| 2 | AM | 45.5 | 26.0 | 42.9 | 30.2 | 22.6 | 25.3 | 68.0 | 39.0 | 42.6 | 40.0 | 6.0 | 85.0 |
|   | PM | 108.0 | 39.1 | 63.8 | 69.8 | 37.9 | 45.6 | 146.0 | 56.0 | 61.6 | 68.0 | 5.0 | 92.6 |
| 3 | AM | 29.9 | 7.4 | 75.2 | 10.5 | 5.1 | 51.7 | 60.0 | 12.0 | 80.0 | 37.0 | 5.0 | 86.5 |
|   | PM | 70.7 | 27.3 | 61.4 | 18.1 | 40.1 | −121.4 | 111.0 | 41.0 | 63.1 | 64.0 | 9.0 | 85.9 |
| 4 | AM | 43.5 | 18.6 | 57.2 | 20.4 | 14.3 | 29.6 | 82.0 | 27.0 | 67.1 | 48.0 | 5.0 | 89.6 |
|   | PM | 47.2 | 16.2 | 72.4 | 23.5 | 12.6 | 46.3 | 95.0 | 26.0 | 72.6 | 43.0 | 14.0 | 67.4 |
| 5 | AM | 52.2 | 14.9 | 71.5 | 15.7 | 11.2 | 28.8 | 65.0 | 33.0 | 49.2 | 58.0 | 5.0 | 91.4 |
|   | PM | 63.4 | 25.5 | 59.8 | 34.1 | 15.9 | 53.4 | 110.0 | 40.0 | 63.6 | 64.0 | 7.0 | 89.1 |
| Average | | 63.0 | 26.3 | 60.0 | 34.1 | 23.5 | 39.3 | 97.8 | 40.6 | 59.0 | 56.8 | 7.0 | 86.8 |

TABLE 6

Composite Sample Testing 300 MLSS @ 30 Min. Contact Time

| | | Total BOD (mg/l) | | | Soluble BOD (mg/l) | | | Soluble COD (mg/l) | | | TSS (mg/l) | | |
|---|---|---|---|---|---|---|---|---|---|---|---|---|---|
| Day | *Time | Primary Effluent | Ballasted Floculation Effluent | Percent Removal | Primary Effluent | Ballasted Floculation Effluent | Percent Removal | Primary Effluent | Ballasted Floculation Effluent | Percent Removal | Primary Effluent | Ballasted Floculation Effluent | Percent Removal |
| 1 | AM | 78.9 | 27.4 | 65.2 | 27.5 | 23.9 | 13.3 | 80.0 | 43.0 | 46.3 | 100.0 | 5.0 | 95.0 |
|   | PM | 115.1 | 34.0 | 70.5 | 64.8 | 27.3 | 57.9 | 149.0 | 55.0 | 63.1 | 79.0 | 5.0 | 93.7 |
| 2 | AM | 58.8 | 30.8 | 47.6 | 30.8 | 26.3 | 14.6 | 80.0 | 42.0 | 47.5 | 67.0 | 5.0 | 92.5 |
|   | PM | 65.0 | 31.1 | 52.2 | 45.2 | 24.6 | 45.6 | 111.0 | 48.0 | 56.8 | 64.0 | 6.0 | 90.6 |
| 3 | AM | 60.8 | 24.3 | 60.0 | 31.6 | 21.7 | 31.5 | 89.0 | 47.0 | 47.2 | 92.0 | 5.0 | 94.6 |
|   | PM | 78.0 | 28.7 | 63.2 | 49.9 | 28.4 | 43.2 | 129.0 | 56.0 | 56.6 | 78.0 | 5.0 | 93.6 |
| Average | | 76.1 | 29.4 | 59.8 | 41.6 | 25.3 | 34.3 | 106.3 | 48.5 | 52.9 | 80.0 | 5.2 | 93.3 |

From the foregoing discussion, it is seen where a ballasted flocculation system, with the addition of activated sludge, can be utilized to remove soluble BOD and suspended solids from a water or wastewater stream.

The present invention may, of course, be carried out in other specific ways than those herein set forth without departing from the scope and the essential characteristics of the invention. The present embodiments are therefore to be construed in all aspects as illustrative and not restrictive and all changes coming within the meaning and equivalency range of the appended claims are intended to be embraced therein.

The invention claimed is:

1. A wastewater treatment facility, comprising:
an activated sludge system having at least one reactor and a clarifier;
a first influent inlet for directing a first wastewater stream to the activated sludge systems;
a ballasted flocculation system having at least one mixing zone and a settling zone;
a second influent inlet for directing a second wastewater stream to the ballasted flocculation system;
a mixing chamber disposed upstream of the ballasted flocculation system; and
a line interconnected between the activated sludge system and the mixing chamber for directing mixed liquor or activated sludge from the activated sludge system to the mixing chamber.

2. The wastewater treatment facility of claim 1 wherein the activated sludge system includes a return activated sludge line extending between the clarifier and the reactor, and wherein the line interconnected between the activated sludge system and the mixing chamber extends between the reactor of the activated sludge system and the mixing chamber or between the return activated sludge line of the activated sludge system and the mixing chamber.

3. The wastewater treatment facility of claim 1 wherein the activated sludge system and the ballasted flocculation system are disposed in parallel relationship.

4. The wastewater treatment facility of claim 1 wherein the settling zone of the ballasted flocculation system clarifies substantially all of the wastewater directed into the treatment facility via the second influent inlet.

5. The wastewater treatment facility of claim 1 wherein the clarifier of the activated sludge system clarifies a substantial portion of the wastewater directed into the treatment facility via the first influent inlet.

6. The wastewater treatment facility of claim 1 where the ballasted flocculation system produces settled sludge and wherein there is provided a sludge return line that extends from the ballasted flocculation system to the activated sludge system and wherein at least a portion of the settled sludge from the ballasted flocculation system can be returned via the sludge return line to the activated sludge system.

7. The wastewater treatment facility of claim 1 wherein the return sludge line leading from the ballasted flocculation system to the activated sludge system includes a line that is communicatively connected to the reactor of the activated sludge system.

8. The wastewater treatment facility of claim 1 wherein the line interconnected between the activated sludge system and the mixing chamber includes a line that is communicatively connected to a return activated sludge line extending between the clarifier and the reactor of the activated sludge system and the mixing chamber.

9. The wastewater treatment facility of claim 1 wherein the mixing chamber includes a mixer for mixing wastewater with mixed liquor or activated sludge from the activated sludge system.

10. A wastewater treatment system, comprising:
an activated sludge system including at least one reactor, a clarifier and a return activated sludge line for conveying return activated sludge from the clarifier to the reactor to form mixed liquor;
a ballasted flocculation system having one or more tanks and a settling zone; and
a mixed liquor or activated sludge supply line for transferring mixed liquor or activated sludge directly or indirectly to the ballasted flocculation system.

11. The wastewater treatment system of claim 10 wherein the supply line includes a mixed liquor supply line for conveying mixed liquor from the reactor of the activated sludge system to wastewater that passes through the ballasted flocculation system for clarification.

12. The wastewater treatment system of claim 10 including a mixing chamber upstream of the ballasted flocculation system, and wherein the mixed liquor or activated sludge supply line leads to the mixing chamber, and wherein mixed liquor or activated sludge can be conveyed from the activated sludge system to the mixing chamber for mixing with wastewater therein.

13. The wastewater treatment system of claim 12 wherein the activated sludge system and the ballasted flocculation system are disposed in parallel relationship, and wherein the activated sludge system includes an influent line for receiving a first wastewater influent stream, and wherein there is a second influent line for receiving a second wastewater influent stream and directing the second wastewater influent stream to the mixing chamber.

14. A combined biological and ballasted flocculation system for treating wastewater, comprising:
a. a biological treatment system comprising an inlet, at least one treatment zone, and a first effluent line;
b. a ballasted flocculation system disposed in a non-series relationship with the biological treatment system, and including an inlet, one or more tanks, a settling zone, and a second effluent line; and
c. a transfer line leading from the biological treatment system for transferring sludge or mixed liquor from the biological treatment system to the ballasted flocculation system such that wastewater passing through the ballasted flocculation system is subjected to biological treatment because of the sludge transferred from the biological treatment systems.

15. The system of claim 14 including a mixing chamber disposed upstream of the ballasted flocculation system and wherein the transfer line is connected between the biological treatment system and the mixing chamber.

16. The system of claim 15 wherein the combined biological and ballasted flocculation system is adapted to receive first and second wastewater streams, one wastewater stream being directed to the biological treatment system and the second stream being directed to the mixing chamber, and therefrom to the ballasted flocculation system.

17. The system of claim 14 wherein the transfer line is connected between the biological treatment system and the ballasted flocculation system.

18. The system of claim 17 wherein the ballasted flocculation system includes multi components and wherein the transfer line leading from the biological treatment system connects to one of the components of the ballasted flocculation system.

* * * * *